United States Patent [19]
Taylor

[11] Patent Number: 5,012,834
[45] Date of Patent: May 7, 1991

[54] FLUID PRESSURE FLARE RELIEF VALVE

[76] Inventor: Julian S. Taylor, 8300 S.W. 8th, Oklahoma City, Okla. 73128

[21] Appl. No.: 580,070

[22] Filed: Sep. 10, 1990

[51] Int. Cl.$^5$ .............................................. F16K 17/14
[52] U.S. Cl. ..................................... 137/70; 137/467; 251/282
[58] Field of Search .................. 137/68.1, 70, 71, 467; 251/282

[56] References Cited
U.S. PATENT DOCUMENTS 1,928,071 9/1933 Mueller ........................... 251/282 X
4,211,250 7/1980 Snyder .............................. 137/467 X

*Primary Examiner*—John C. Fox
*Attorney, Agent, or Firm*—Robert K. Rhea

[57] ABSTRACT

A fluid pressure flare relief valve is formed by a valve body having axially aligned inlet and outlet tubular ends forming a passageway adapted to be interposed in a fluid line. The valve body is circumferentially enlarged and provided with a lateral opening normally closed by a double-wall valve head forming a valve head chamber. The enlarged valve body portion contains a box-like chamber integral with the downstream end portion of the valve for communication therewith and normally closing the valve passageway. The chamber forming box member is line drilled to form a pair of apertures normally closed by a pair of pistons mounted on a piston rod. One end of the rod extends outwardly through the valve head. A small diameter piston contained by a cylinder projecting into the valve head surrounds the piston rod and is connected therewith for supporting one end of a pressure release pin having its other end supported by a pin cage. Fluid pressure against the small piston and one of the pair of pistons unbalances the other piston for movement of the rod toward the pressure release pin which collapses and opens the valve passageway when a predetermined pressure is in the upstream end portion of the valve.

6 Claims, 1 Drawing Sheet

FIG. 1

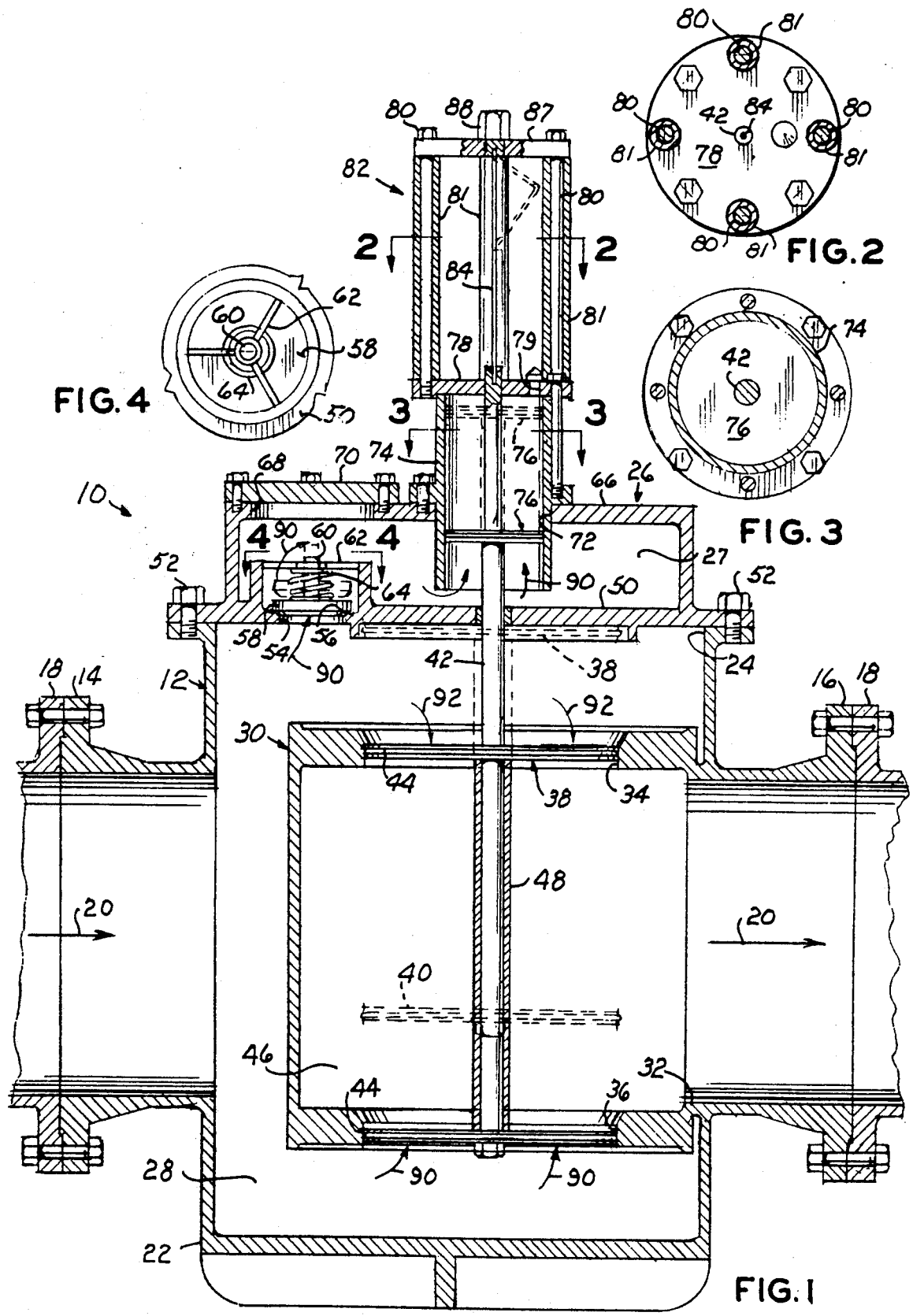

FLUID PRESSURE FLARE RELIEF VALVE

BACKGROUND OF THE INVENTION

1. Field of the invention.

This invention relates to fluid pressure relief and, more particularly, to a normally closed relief valve interposed in a natural gas flare system in which its purpose is to relieve pressure when it reaches a predetermined set point.

In the chemical industry, tanks containing toxic fluid are connected in parallel with a waste or discharge line for conducting toxic fluid spills or overflow to a safe point of disposal.

This invention provides a pressure relief valve which is interposed in the waste disposal line and normally closes the line unless excess pressure in the upstream end of the line exceeds a predetermined value. The relief valve then opens to permit the toxic fluid to flow through the line without any of the toxic fluid polluting the environment at or near the position of the relief valve.

2. Description of the prior art.

I do not know of any spring loaded non-reclosing relief valves which may be interposed in a fluid line which normally closes the line but opens it under a predetermined value of excess pressure and capable of being pressure balanced on the downstream end.

SUMMARY OF THE INVENTION

A valve body having axially aligned inlet and outlet end portions forms a flow passageway adapted to be interposed in a fluid line. The valve body is circumferentially enlarged and provided with a lateral opening normally enclosed by a double-wall valve head forming a valve head chamber. The valve head inner wall is provided with a spring closed pressure balancing valve providing communication between the interior of the valve body and a pilot piston in the valve head chamber.

The downstream or outlet end of the valve body is normally closed by a transversely apertured axially disposed chamber-forming box connected with the wall of the valve body at its downstream end. The interior of the box chamber is in direct communication with the downstream end portion of the valve flow passageway.

First and second equal diameter pistons normally close the apertures of the box chamber. The pistons are axially connected with a piston rod projecting laterally outward through the valve head. A pilot piston cylinder of smaller diameter than the first and second pistons axially surrounds the outwardly projecting end portion of the piston rod and projects through the outer wall of the valve head and axially contains a pilot piston secured to the piston rod.

A pin cage is axially connected with the outward end portion of the small cylinder and a pressure relief pin is axially disposed between the outer end of the cage and the adjacent end of the piston rod.

Upstream fluid pressure above a predetermined pressure biases the balancing valve open to allow the fluid to enter the valve head chamber through a check valve and bias the pilot piston outwardly, unbalancing the first piston with respect to the second piston which forces the first and second pistons toward the valve head. The piston rod axial outward movement collapses the pressure relief pin and the first and second pistons movement opens the chamber apertures to permit downstream fluid flow, without any of the fluid being released into the environment at the position of the relief valve.

The principal object of this invention is to provide an in-line pressure release valve normally closing the line for opening the line for fluid flow therethrough any time the upstream fluid pressure exceeds a predetermined value.

BRIEF DESCRIPTION OF THE DRAWINGS

FIG. 1 is a vertical cross-sectional view of the valve in closed position and illustrating by dotted lines the valve in open position;

FIGS. 2 and 3 are horizontal cross-sectional views taken substantially along the lines 2—2 and 3—3 of FIG. 1, respectively; and, FIG. 4 is a top view looking in the direction of the line 4—4 of FIG. 1.

DESCRIPTION OF THE PREFERRED EMBODIMENTS

Like characters of reference designate like parts in those figures of the drawings in which they occur.

In the drawings:

The reference numeral 10 indicates the valve as a whole having a valve body 12 and axially aligned tubular upstream and downstream flanged end portions 14 and 16, respectively, for connection with cooperating ends of a pipeline 18 and defining a flow passageway indicated by the direction arrows 20.

The valve body is circumferentially enlarged medially its ends, as at 22, having a lateral opening 24 closed by a valve head means 26 defining a valve chamber 27 for communication with the upstream end of the valve body.

The flow passageway is interrupted in the body chamber 28 by a box-like housing 30, having its downstream side open, as at 32, and joined with the body wall at its junction with the downstream end tubular portion 16 of the valve body.

The box-like housing 30 is line-drilled vertically through opposing horizontal walls, as viewed in the drawing, to form a pair of diametrically equal apertures 34 and 36, each normally closed by pistons 38 and 40, respectively.

The pistons 38 and 40 are mounted on a piston rod 42 projecting outwardly of the valve body through the valve head means 26 for the purposes presently explained. Each of the pistons 38 and 40 are characterized by a piston seal ring, such as an O-ring 44, for sealing with the respective aperture forming wall and isolating the box chamber 46 from the housing chamber 28 and the upstream end of the flow passageway 20. A sleeve 48 surrounds the piston rod 42 between the pistons 38 and 40 to maintain them in spaced relation.

The valve head means 26 is hollow box-like in general configuration having an inner or base wall 50 slidably receiving the piston rod 42 and secured to the flanged end of the opening 24 as by bolts 52. The base wall 50 is provided with an aperture 54 normally closed by a poppet valve 58, having a stem 60 projecting through a spider 62 and urged into a sealing relation with the valve seat 56 by a spring 64 for the purposes presently explained.

The outer wall 66 of the valve head means is provided with an access opening 68 normally closed by an access plate 70 for servicing the valve 58. The valve head outer end wall 66 is further apertured as at 72 for receiving a pilot piston cylinder 74, diametrically smaller than the pistons 38 and 40, and containing a pilot piston 76, similarly 0-ring-sealed with the inner wall surface of the cylinder 74. The outer end of the cylinder 74 is closed by a plate 78 axially slidably receiving the outward end portion of the piston rod 42. The plate 78 has an off-center vent 79 for air movement into and out of the cylinder 74 end portion between the pilot piston 76 and the plate 78 during the opening and resetting action of the valve pistons 38 and 40 as hereinafter explained.

Upstanding pin cage means 82 is axially connected with the cylinder plate 78 and extends beyond the outward end of the piston rod for axially supporting an axially collapsible pressure relief pin 84 in combination with the adjacent end of the piston rod. The pin cage means 82 comprises a plurality (four) of rod-like bolts 80, connected in 90° spaced relationship with the cylinder plate 78 and having a pin end plate 87 at their outward ends axially supporting a pin holder 88. Each of the bolts 80 is surrounded by a sleeve spacer 81 for maintaining the pin end plate 87 a predetermined distance from the pilot cylinder end plate 78.

Operation

In operation the valve 10 is assembled and interposed in the line 18 as described hereinabove. The sliding fit between the piston rod 42 and the valve head inner wall 50 permits fluid pressure leakage to slowly equalize fluid pressure in the valve head chamber 27 with the upstream valve chamber 28.

When excess pressure from the upstream end of the valve bears against the pistons 40 and 76 through the valve 58 filling the valve head chamber 27, in the direction of the arrows 90, the combined area of the piston 40 and the pilot piston 76 is greater than the upstream fluid pressure against the other piston 38 in the direction of the arrows 92 so that the pistons 40 and 76 quickly move the piston rod 42 outwardly and collapse the release pin 84, as shown by their dotted line positions. Full opening of the passageway 20 by the pistons 38 and 40 moving to their dotted line positions is assured by check valve 58 remaining open for maintaining the upstream fluid pressure against the pilot piston 76. This action opens the piston apertures 34 and 36 providing communication through the passageway 20 and the housing chamber 46 to exhaust the excess fluid pressure in the upstream end portion of the flow passageway.

When the problem generating the excess upstream fluid pressure has been corrected and toxic fumes in the line 18 have been removed or exhausted, the valve is reset by moving the pistons 38, 40, and 76 and the piston rod 42, as a unit, to the solid line position of the drawings. A new collapsible pin 84 is installed between the end of the piston rod and the pin holder 88.

Obviously the invention is susceptible to changes or alterations without defeating its practicability. Therefore, I do not wish to be confined to the preferred embodiment shown in the drawings and described herein.

I claim:

1. An in-line fluid pressure relief valve, comprising:
   a valve body having a lateral opening and having axial inlet and outlet flow passageway forming end portions adapted to be interposed in a pipe line;
   wall means including opposing spaced-apart walls interposed in the flow passageway and secured to the body outlet end portion for normally closing the downstream end portion of the flow passageway, each wall of said spaced-apart walls having an aperture coaxially aligned with a cooperating aperture in the opposite wall;
   pistons means having a common piston rod projecting laterally of said body for normally closing the wall apertures;
   collapsible pin means axially connected with the outward end of said piston rod for normally maintaining said pistons in wall aperture closed position;
   valve head means for closing the valve body lateral opening and biasing said pistons in a pin collapsing direction for opening the wall apertures and flow passageway in response to upstream fluid pressure above a predetermined value.

2. The in-line relief valve according to claim 1 in which said valve head means comprises:
   a generally hollow valve head having spaced-apart inner and outer end walls surrounding the piston rod and secured to said valve body, said valve head inner wall having an opening providing communication between the upstream end portion of the flow passageway and the hollow valve head;
   check valve means normally closing the valve head inner wall opening;
   pilot piston means supported by said valve head means including a pilot piston secured to said piston rod for biasing the piston rod in a pin collapsing piston unbalanced flow passageway opening direction by fluid pressure above a predetermined value entering said hollow valve head through said check valve means.

3. The in-line relief valve according to claim 2 in which said check valve means includes:
   a poppet valve within said hollow head; and,
   spring means for normally biasing the poppet valve toward a valve head inner wall opening closed position.

4. The in-line relief valve according to claim 3 in which said pilot piston means includes:
   a cylinder surrounding said pilot piston and supported at one end portion by said valve head outer wall; and,
   a cylinder end wall surrounding said piston rod and secured to the other end portion of said cylinder.

5. The in-line relief valve according to claim 4 in which said piston means includes:
   a pair of pistons.

6. The in-line relief valve according to claim 5 in which said collapsible pin means includes:
   pin cage means axially projecting outward from said cylinder end wall and said piston rod; and,
   a collapsible pin axially supported between the outward end
   portions of said pin cage means and said piston rod.

* * * * *